Dec. 23, 1952 G. M. EVANS 2,623,133
AUTOMOBILE SAFETY IGNITION LOCK
Filed Sept. 30, 1949 2 SHEETS—SHEET 1
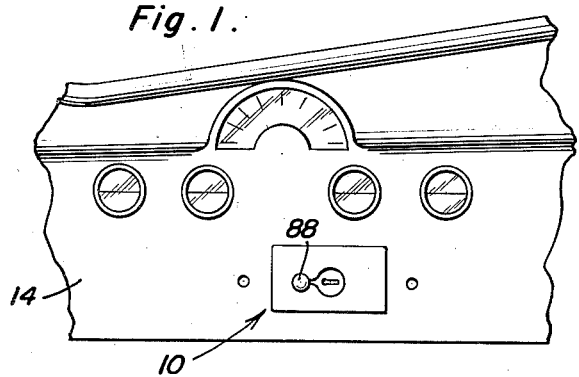
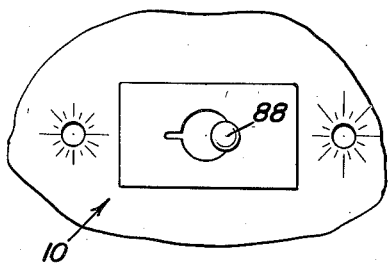
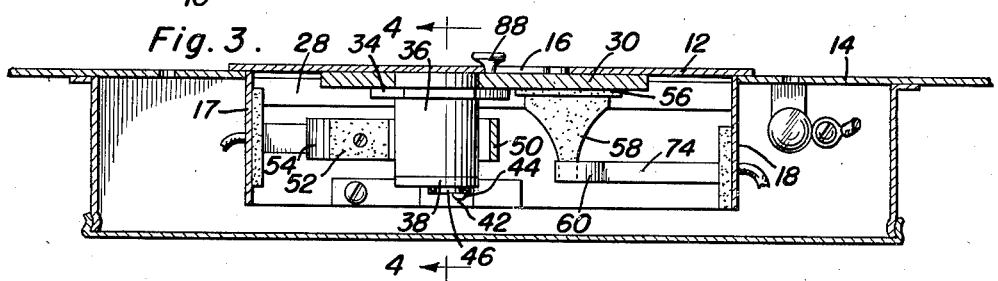
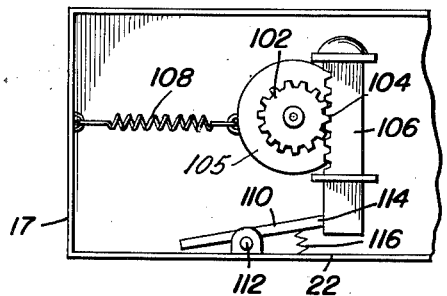
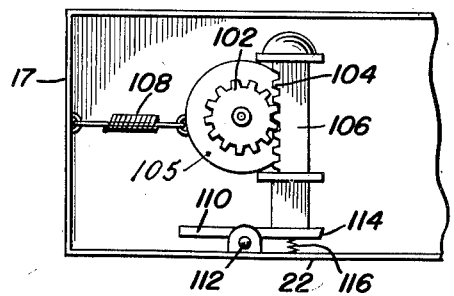
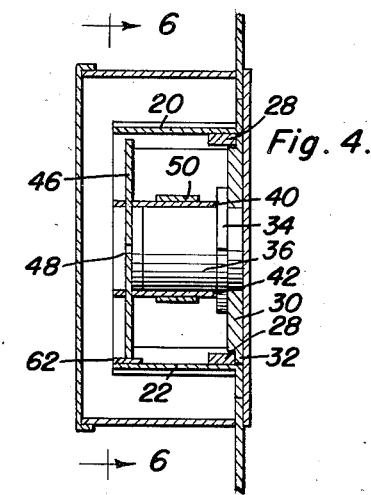
George M. Evans
INVENTOR.
BY *Clarence A. O'Brien*
*and Harvey B. Jacobson*
Attorneys Dec. 23, 1952  G. M. EVANS  2,623,133
AUTOMOBILE SAFETY IGNITION LOCK Filed Sept. 30, 1949  2 SHEETS—SHEET 2

George M. Evans
INVENTOR.

BY *Clarence A. O'Brien*
*and Harvey B. Jacobson*
Attorneys

Patented Dec. 23, 1952

2,623,133

UNITED STATES PATENT OFFICE 2,623,133

AUTOMOBILE SAFETY IGNITION LOCK

George M. Evans, Tucson, Ariz.

Application September 30, 1949, Serial No. 118,855

19 Claims. (Cl. 200—44)

This invention relates to locks, and more particularly to those locks used in an ignition system for an automobile or other vehicles.

An object of the invention is to provide means whereby the withdrawal of the lock key is essential to the closing of the ignition circuit to thus preclude the negligent or absent-minded leaving of the key in the lock.

Another object of the invention is to provide a simple electric circuit which may be readily connected to the ignition lock of an automobile or other vehicle, the circuit and associated parts serving as positive means to prevent the careless retention of the ignition key within the body of the lock.

A large portion of the automobiles stolen in the United States are easily misappropriated by reason of the fact that the owners or drivers leave their cars parked with the ignition key in the lock. This of course, is an invitation to a thief as well as to a "joy riding" adolescent. Such thefts, due to their owners' or the drivers' carelessness, can be prevented which would result in a great saving to the people of the United States. Therefore, it is another object of my invention to employ positive means for preventing the retention of a key in the ignition lock when the circuit to the ignition is closed, in addition to signal indicating means to prevent the careless habits of the owners or drivers from inviting their cars to be stolen.

These, together with the various additional objects of the invention, which will later become apparent as the following description proceeds, are attained by this device, preferred embodiments of which have been illustrated in the accompanying drawings, wherein:

Figure 1 is a front elevational view of the safety ignition lock, showing it in emplacement in the automobile dashboard, when the ignition is off;

Figure 2 is another elevational view showing the lock in a position with the ignition on;

Figure 3 is a horizontal sectional view taken along line 3—3 in Figure 6;

Figure 4 is a vertical sectional view taken along the line 4—4 in Figure 3;

Figure 8 is a rear elevational view of a portion of another embodiment of the invention in the "off" position; and, Figure 9 is a vertical elevational view of the embodiment of the lock of Figure 8 and showing the system in the "on" position.

Figure 5:
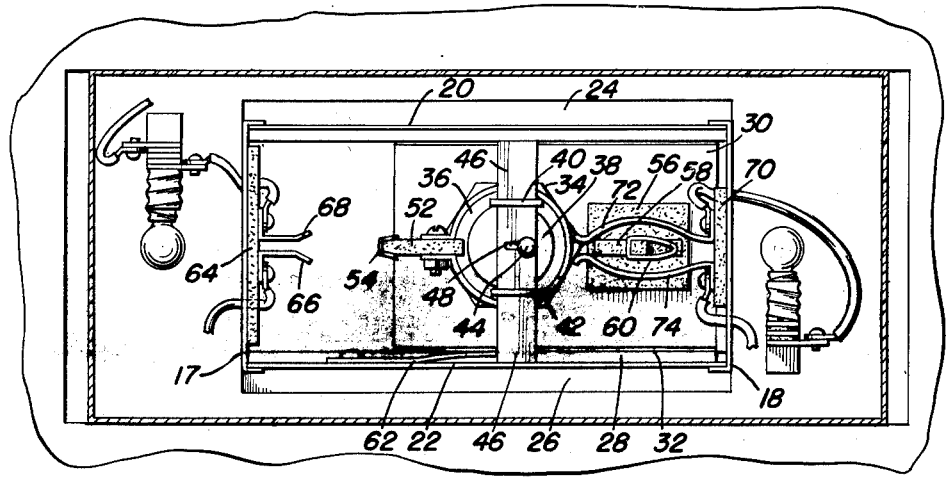
Figure 5 is a rear elevational view showing the lock in the "off" position.
Figure 6:
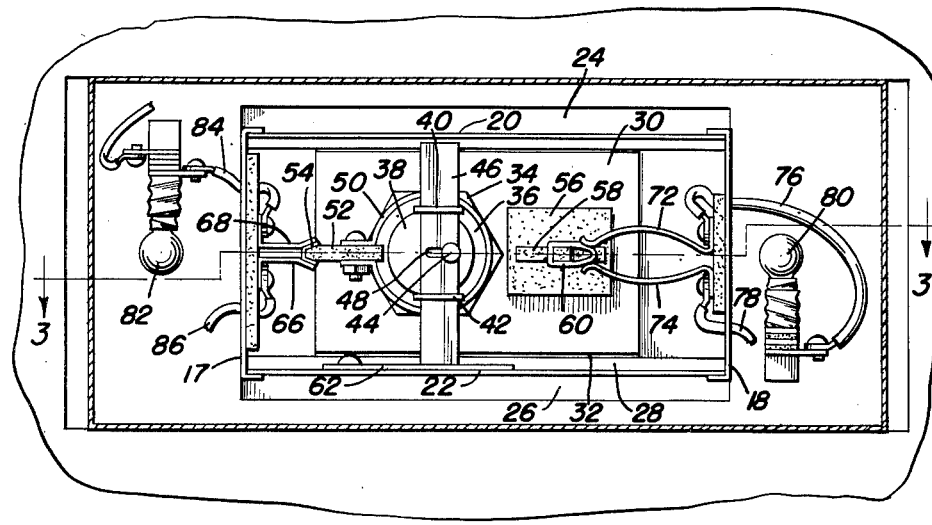
Figure 6 is a rear elevational view of the invention showing the ignition lock in the "on" position.
Figure 7:
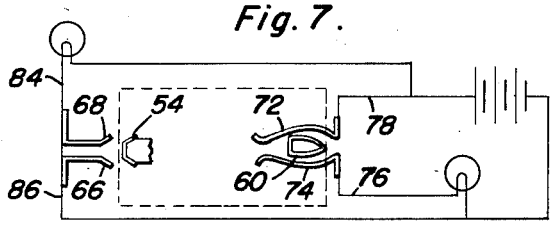
Figure 7 is a schematic circuit diagram of the electrical connections of the invention.

With continued reference to the accompanying drawings, wherein like numerals designate similar parts throughout the various views, attention is directed first to the embodiment of Figures 1 through 7, wherein is shown the invention in its first form. The automobile safety ignition lock is designated generally by the reference numeral 10 and is positioned as desired in the automobile dashboard. The lock 10 comprises a container having a front wall 12 rigidly secured to the dashboard 14 and having an aperture 16 therein. Side walls 17 and 18 are rigidly secured to the front wall 12.

The top and bottom of the container, indicated by reference numerals 20 and 22, are secured to the front wall 12 by means of flanges 24 and 26. The bar 28 is secured to the bottom 22 and is spaced from the front wall 12 so that the plate 30 may be slidably mounted with its recessed bottom edge 32 positioned within the space between the front wall 12 and the bar 28.

Attached to the plate 30 by means of a nut 34 or the like is the housing 36 of a lock. Extending through the housing is the barrel 38 of the lock. The lock barrel is retained within the housing by tumblers. Attached to the housing 36 are a pair of latch guide plates 40 and 42. Secured to the inner end of the barrel 38 is a pin 44 which is eccentrically located on the barrel at a point dislocated from the center of rotation of the barrel. The latch guide plates 40 and 42 are provided with slots in which the latch 46 is slidably mounted. A slot 48 is provided in the latch 46 to which the pin 44 extends. Surrounding the housing 36 is a clamp 50 having its opposed ends secured to an insulated member 52 which has an electrical contact 54 connected thereon.

Attached to the rear of the plate 30 is an insulated square 56 from which and at right angles thereto an insulated lug 58 extends. Adjacent the end of the lug 58 is a contact for an electrical switch 60.

Stop means 62 comprising a leaf spring is secured at one end thereof to the bottom 22. The other end of the spring 62 is displaced upward for engagement with the latch 46.

Secured to the side wall 18 and insulated therefrom by insulative layer 64 is a pair of contact springs 66 and 68, which when contact 54 is inserted therebetween, form an electrical circuit. Secured to the side wall 18 and insulated therefrom by insulative layer 70 is a second pair of contact springs 72 and 74 respectively.

By means of suitable electrical conductors such as 76 and 78 an electric lamp 80 is connected across the circuit of the spring switch 72 and 74. Another lamp 82, or an ammeter if preferred, may additionally be secured across spring contacts 66 and 68 by means of suitable conductors such as 84 and 86.

The operation of this ignition lock is as follows:

When the device is in the position as shown in Figures 1 and 5, a suitable key is inserted into the barrel 38 of the lock and turned clockwise the proper amount, preferably one-quarter turn. This will cause the cam 44 to raise the latch 46 to the level of the stop 62. Then the key is pushed to the right which causes the latch 46 to overlie the spring stop 62. At that point the key is then turned counterclockwise which will cause the barrel 38 to rotate causing the pin 44 to force the latch 46 to depress the spring 62. It is to be noted that the key will act as a stop and must be withdrawn before the circuit can be closed by pushing on button 88. By means of button 88 the plate 30 may be pushed all the way to the right so that the contact 54 is positioned between the spring contact 66 and 68. This will close the circuit to the lamps, and the circuit to the distributor or other electrically operated mechanism may be likewise closed.

Now referring more particularly to Figures 8 and 9, it will be seen that a modification of the device is illustrated therein. In lieu of the cam or pin 44 the barrel is provided at its innermost end with a gear 102 whose teeth are adapted to engage teeth 104 on latch 106 mounted on the lock housing 105 in a manner similar to latch 46 and as shown in Figure 9. A spring is attached to the side wall 16 and is indicated by reference numeral 108. A stop member 110 is pivotally mounted as at 112 to the base and has its abutting end biased away from the base 22 by spring 116.

The operation of the further embodiment as shown in Figures 8 and 9 is as follows:

By rotation of the barrel, the gear 102 is turned which places the latch 106 above the stop 110. The key and latch is then moved toward the wall 16 until the key acts as a stop. The key is then rotated and then withdrawn whereby the spring 108 pulls the barrel, the latch, and the contact makers to the position as shown in Figure 9.

Since, from the foregoing, the construction and advantages of the invention are apparent, further description is believed to be unnecessary.

However, since numerous modifications and various embodiments in structure and design will readily occur to those skilled in the art after a consideration of the foregoing specification and accompanying drawings, it is not intended to limit the invention to the exact construction shown and described, but to include all suitable modifications and equivalents which may fall within the scope of the appended claims.

Having described the invention, what is claimed as new is:

1. A lock switch for an ignition system comprising a plate slidably mounted within a container, a lock housing mounted on said plate, a lock barrel selectively rotatably positioned in said housing, guide means secured to said housing, cam means secured to said barrel and extending therefrom, a latch slidably mounted within said guide means, said latch having a slot therein, said cam means engaging said latch in said slot, stop means on said container selectively engaged by said latch, and contact making means secured to said plate and electrically insulated therefrom.

2. The structure of claim 1 wherein said guide means comprises a pair of latch guide plates, each of said latch guide plates having a slot in one end thereof, said latch being slidably positioned within said slots.

3. The structure of claim 2 wherein said cam means comprise a pin eccentrically mounted on said barrel by being displaced from the center of rotation thereof.

4. The structure of claim 3 wherein said stop means comprise a leaf spring having one end secured to said container, the other end of said leaf spring abutting said latch when said barrel is in a first position, upon rotation of said barrel said pin raising said latch whereby said latch and said plate can be moved in a predetermined direction until said contact making means complete electrical circuits.

5. The structure of claim 1 wherein said container comprises a front wall, a top and a bottom, and side walls.

6. The structure of claim 5 wherein said front wall has an aperture therein.

7. The structure of claim 6 wherein said barrel has a recess therein, said recess being in selective alignment with said aperture, said aperture being larger than said recess.

8. The structure of claim 7 including pin means attached to said plate, said pin means extending through said aperture.

9. The structure of claim 8 wherein said guide means comprise a pair of latch guide plates, each of said latch guide plates having a slot in one end thereof, said latch being slidably positioned within said plates.

10. The structure of claim 9 wherein said cam means comprise a pin eccentrically mounted on said barrel by being displaced from the center of rotation thereof.

11. A lock switch for an ignition comprising a plate slidably mounted within a container, a lock housing mounted on said plate, a lock barrel selectively rotatably positioned in said housing, guide means secured to said housing, cam means secured to said barrel and extending therefrom, a latch slidably mounted within said guide means, said latch having a slot therein, said cam means engaging said latch in said slot, stop means on said container selectively engaging said latch, and contact making means secured to said plate and electrically insulated therefrom, said stop means comprising a leaf spring having one end secured to said container, the other end of said leaf spring abutting said latch when said barrel is in a first position, upon rotation of said barrel said cam means raising said latch whereby said latch and said plate can be moved in a predetermined direction until said contact making means complete electrical circuits.

12. A lock switch for an ignition system comprising a plate slidably mounted within a container, a lock housing mounted on said plate, a lock barrel selectively rotatably positioned in said housing, guide means secured to said housing, means secured to said barrel and extending therefrom engaging a latch slidably mounted within said guide means, and stop means secured to said container selectively engaged by said latch.

13. The structure of claim 12 wherein said means secured to said barrel comprises a gear.

14. The structure of claim 13 wherein said latch has one of its surfaces toothed for engagement with said gear.

15. The structure of claim 14 wherein said guide means comprises a pair of latch guide plates, each of latch guide plates having a slot in one end thereof, said latch being slidably positioned within said plate.

16. The structure of claim 15 wherein said container comprises a front wall, a top and bottom, and side walls.

17. The structure of claim 16 wherein said front wall has an aperture therein.

18. The structure of claim 17 wherein said barrel has a recess therein, said recess being in selective alignment with said aperture, said aperture being larger than said recess.

19. The structure of claim 18 including pin means attached to said plate, said pin means extending through said aperture.

GEORGE M. EVANS.

No references cited.